(12) United States Patent
Yao et al.

(10) Patent No.: US 11,385,394 B2
(45) Date of Patent: Jul. 12, 2022

(54) REFLECTIVE DISPLAY DEVICE AND FRONT LIGHT SOURCE MODULE THEREOF

(71) Applicant: Sichuan Longhua Film Co., Ltd., Mianyang (CN)

(72) Inventors: Po-Hung Yao, Hsinchu (TW); Yao-Chang Wang, Zhubei (TW)

(73) Assignee: Sichuan Longhua Film Co., Ltd., Mianyang (CN)

( * ) Notice: Subject to any disclaimer, the term of this patent is extended or adjusted under 35 U.S.C. 154(b) by 0 days.

(21) Appl. No.: 17/237,075

(22) Filed: Apr. 22, 2021

(65) Prior Publication Data
US 2021/0356642 A1 Nov. 18, 2021

(30) Foreign Application Priority Data
May 14, 2020 (CN) .......................... 202010407083.1

(51) Int. Cl.
*F21V 8/00* (2006.01)

(52) U.S. Cl.
CPC ......... *G02B 6/0041* (2013.01); *G02B 6/0023* (2013.01); *G02B 6/0035* (2013.01); *G02B 6/0038* (2013.01); *G02B 6/0058* (2013.01); *G02B 6/0073* (2013.01)

(58) Field of Classification Search
CPC ... G02B 6/0041; G02B 6/0023; G02B 6/0073
See application file for complete search history.

(56) References Cited

U.S. PATENT DOCUMENTS

| | | | | |
|---|---|---|---|---|
| 5,764,322 A | * | 6/1998 | Mamiya | G02F 1/13362 349/67 |
| 6,239,851 B1 | * | 5/2001 | Hatazawa | G02B 6/0056 359/485.02 |
| 7,252,425 B2 | * | 8/2007 | Park | G02B 6/0055 362/616 |
| 7,425,089 B2 | * | 9/2008 | Masuda | G02B 6/0056 362/616 |
| 2002/0172031 A1 | * | 11/2002 | Masuda | G02B 6/0035 362/601 |
| 2010/0066957 A1 | * | 3/2010 | Miyazaki | G02B 5/0278 349/112 |
| 2012/0293744 A1 | * | 11/2012 | Watanabe | G02F 1/133504 385/129 |

(Continued)

*Primary Examiner* — Fatima N Farokhrooz

(57) ABSTRACT

A front light source module includes a light guide assembly and a light source assembly. The light guide assembly includes a light guide body and surface optical microstructures. The light guide body includes a first optical surface, a second optical surface opposite to the first optical surface, and a light incident surface. The light incident surface is connected between the first and second optical surfaces. The first optical surface is close to a viewer. The surface optical microstructures are embedded in the light guide body. Each surface optical microstructure includes an inclined surface and a transflective layer. The inclined surface is relatively inclined to the first optical surface or the second optical surface. The transflective layer is disposed on the inclined surface. The light source assembly is disposed beside the light incident surface. A reflective display device adopting the front light source module is also provided.

18 Claims, 5 Drawing Sheets

(56) References Cited

U.S. PATENT DOCUMENTS

| | | | | |
|---|---|---|---|---|
| 2014/0267982 | A1* | 9/2014 | Mitsui | G02B 5/0289 |
| | | | | 349/96 |
| 2020/0233217 | A1* | 7/2020 | Kuno | G02B 27/0081 |
| 2020/0371388 | A1* | 11/2020 | Geng | G02B 6/0031 |
| 2022/0035089 | A1* | 2/2022 | Arazi | G02F 1/133615 |

* cited by examiner

REFLECTIVE DISPLAY DEVICE AND FRONT LIGHT SOURCE MODULE THEREOF

FIELD OF THE INVENTION

The invention relates to a display device, and more particularly to a reflective display device and a front light source module thereof.

BACKGROUND OF THE INVENTION

With the development and promotion of the 5th generation mobile networks (that is, the 5G communication technology), the ultra-high-speed communication has opened the door to imaginative applications for a large number of wireless data transmissions, and the corresponding information receiving and display devices also enter the era of technical requirements for ultra-high resolution and low power consumption. It is expected that the convenience of information transmission will greatly increase the time of using the display device. In order to achieve both of the low power consumption and improved eye protection for long-term viewing, the technological development of the new generation of reflective display panel and its related components has become an important subject.

Different from the traditional direct light display panels (such as LCD, OLED, MicroLED, etc.), the reflective display panels have a light reflection characteristic similar to paper, such as the characteristics of high visibility in sunlight, power saving, and lightness. However, for a non-self-luminous reflective display panel, the visibility of the panel will be greatly reduced in an environment with no external light source. Therefore, how to provide a stable source of illumination for the reflective display panel without affecting the display screen will be a key element in determining whether the reflective panel products can be applied and popularized in the future.

SUMMARY OF THE INVENTION

The present invention provides a reflective display device and a front light source module thereof, which can improve low image brightness and poor contrast presented by the reflective display device, thereby improving the environmental adaptability of the reflective display device.

The front light source module provided by the present invention is applied to a reflective display device. The front light source module includes a light guide assembly and a light source assembly. The light guide assembly includes a light guide body and a plurality of surface optical microstructures. The light guide body includes a first optical surface, a second optical surface and at least one light incident surface. The first optical surface and the second optical surface are opposite to each other. The at least one light incident surface is connected between the first optical surface and the second optical surface. The first optical surface is close to a viewer. The surface optical microstructures are embedded in the light guide body. Each of the surface optical microstructures at least includes an inclined surface and a transflective layer. The inclined surface is relatively inclined to one of the first optical surface and the second optical surface. The transflective layer is disposed on the inclined surface. The light source assembly is disposed beside the at least one light incident surface.

In an embodiment of the present invention, the inclined surface has a first end edge and a second end edge opposite to each other. The first end edge is adjacent to the first optical surface. The second end edge is adjacent to the second optical surface. The first end edge is biased toward the light incident surface, and the second end edge is away from the light incident surface.

In an embodiment of the present invention, an angle between the inclined surface and the second optical surface is between 3 degrees and 88 degrees. Angles of the inclined surfaces of the surface optical microstructures are consistent or inconsistent.

In an embodiment of the present invention, a shape of the inclined surface is rectangular, circular, elliptical, polygonal, or a combination thereof, and a maximum structural width of the inclined surface is between 2 microns and 60 microns.

In an embodiment of the present invention, the inclined surface is undulating, and a maximum structural width of the inclined surface is not greater than 60 microns.

In an embodiment of the present invention, the surface optical microstructures are arranged in a matrix between the first optical surface and the second optical surface.

In an embodiment of the present invention, the transflective layers of the surface optical microstructures have different distribution densities in the light guide body. The farther an area from the light source assembly, the higher the distribution density of the transflective layers.

In an embodiment of the present invention, the light guide body is made of a single polymer material or a layered combination of two or more polymer materials. An optical haze of the light guide body is not greater than 25%.

In an embodiment of the present invention, a transmittance of the transflective layer is greater than a reflectivity thereof.

In an embodiment of the present invention, the transflective layer is an optical coating or a rough surface layer.

In an embodiment of the present invention, the light source assembly includes at least one light-emitting diode element.

In an embodiment of the present invention, the light source assembly further includes a light angle converging element disposed between the light-emitting diode element and the light incident surface.

In an embodiment of the present invention, the light guide assembly further includes a functional coating disposed on the first optical surface. The functional coating is an anti-glare layer or an anti-reflection structure layer.

The reflective display device provided by the present invention includes a display panel and the aforementioned front light source module. The front light source module is disposed on the display panel. The second optical surface of the front light source module faces the display panel.

In an embodiment of the present invention, an air barrier is provided between the second optical surface and the display panel.

In an embodiment of the present invention, a transparent adhesive medium layer is provided between the second optical surface and the display panel, and a refractive index of the transparent adhesive medium layer is greater than 1.36.

In an embodiment of the present invention, an illuminating beam incident from the at least one light incident surface is transmitted and reflected in the light guide assembly and exits the second optical surface to the display panel. A part of the illuminating beam is reflected by the display panel as an image beam. The image beam passes through the light guide assembly and exits the first optical surface to the viewer.

In an embodiment of the present invention, the illumination beam emitted to the display panel is distributed within a specific exit angle range. A normal line is defined perpendicular to the display panel. An angle between the illumination beam emitted to the display panel and the normal line is less than 45 degrees.

In an embodiment of the present invention, the reflective display device further includes a transparent conductive layer and a transparent conductive pattern layer. The transparent conductive layer is disposed on one of the first optical surface and the second optical surface, and the transparent conductive pattern layer is disposed on the other one of the first optical surface and the second optical surface.

In an embodiment of the present invention, the reflective display device further includes at least one phase difference optical layer disposed between the display panel and the light guide assembly or between the light guide assembly and the viewer.

In the present invention, the image presentation of the display panel is achieved by the reflection of the illumination beam of the front light source module, the light guide assembly of the front light source module is embedded with the surface optical microstructures, and the inclined surface of the surface optical microstructure makes the illuminating beam emitted to the display panel distributed within a specific emission angle range. Thus, the low brightness and poor contrast of the image presented by the reflective display device can be avoided when the external light source is insufficient, thereby improving the environmental adaptability of the reflective display device.

Other objectives, features and advantages of the present invention will be further understood from the further technological features disclosed by the embodiments of the present invention.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
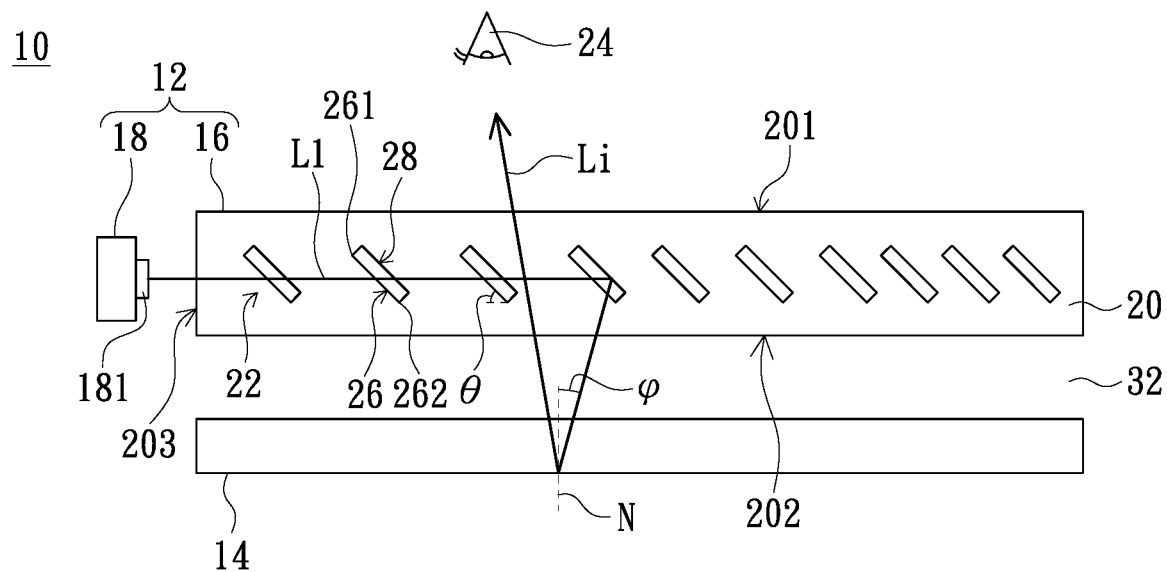
FIG. 1 is a schematic cross-sectional structure diagram of a reflective display device according to an embodiment of the present invention.
Figure 2:
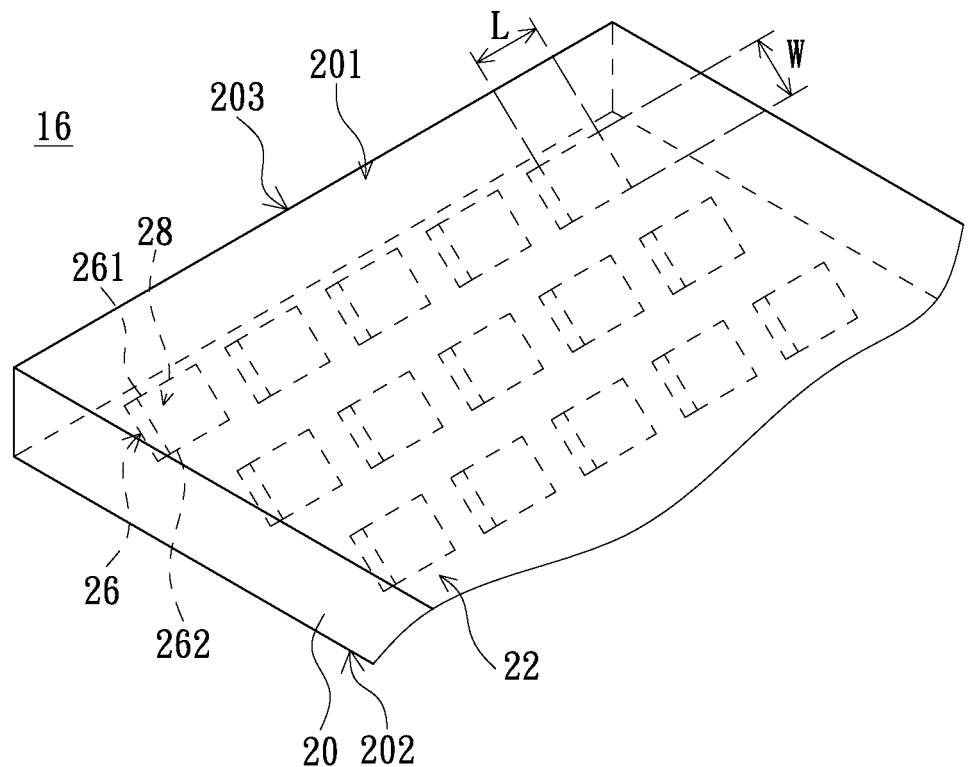
FIG. 2 is a partial structural diagram of a light guide assembly according to an embodiment of the present invention.

FIG. 1 is a schematic cross-sectional structure diagram of a reflective display device according to an embodiment of the present invention. As shown in FIG. 1, the reflective display device 10 includes a front light source module 12 and a display panel 14. The front light source module 12 is disposed on the display panel 14. The front light source module 12 includes a light guide assembly 16 and a light source assembly 18. FIG. 2 is a partial structural diagram of a light guide assembly according to an embodiment of the present invention. Please refer to FIGS. 1 and 2. The light guide assembly 16 includes a light guide body 20 and a plurality of surface optical microstructures 22. The light guide body 20 is, for example, in the shape of a plate and has a first optical surface 201, a second optical surface 202 and a light incident surface 203. The first optical surface 201 and the second optical surface 202 are opposite to each other, and the light incident surface 203 is connected between the first optical surface 201 and the second optical surface 202. In one embodiment, the first optical surface 201 is close to the viewer 24 above, and the second optical surface 202 faces the display panel 14. The light guide body 20 can be formed by a single polymer material or a layered combination of two or more polymer materials. The light guide assembly 16 has high transparency, and the optical haze of the light guide body 20 is not greater than 25%.

Follow the above description. The surface optical microstructures 22 are embedded in the light guide body 20. In one embodiment, the surface optical microstructures 22 are arranged in a matrix between the first optical surface 201 and the second optical surface 202. The surface optical microstructure 22 is, for example, in the shape of a sheet and has an inclined surface 26 and a transflective layer 28. The inclined surface 26 is relatively inclined to the first optical surface 201 or the second optical surface 202. The transflective layer 28 is disposed on the inclined surface 26. In one embodiment, the inclined surface 26 has a first end edge 261 and a second end edge 262 opposite to each other. The first end edge 261 is adjacent to the first optical surface 201, and the second end edge 262 is adjacent to the second optical surface 202. Preferably, the inclined configuration of the inclined surface 26 is that the first end edge 261 is biased toward the light incident surface 203 and the second end edge 262 is away from the light incident surface 203. An angle θ is formed between the inclined surface 26 and the second optical surface 202 or the first optical surface 201. The angle θ is between 3 degrees and 88 degrees. The angles of the inclined surfaces 26 of the surface optical microstructures 22 may be consistent or inconsistent.

Figure 3A:
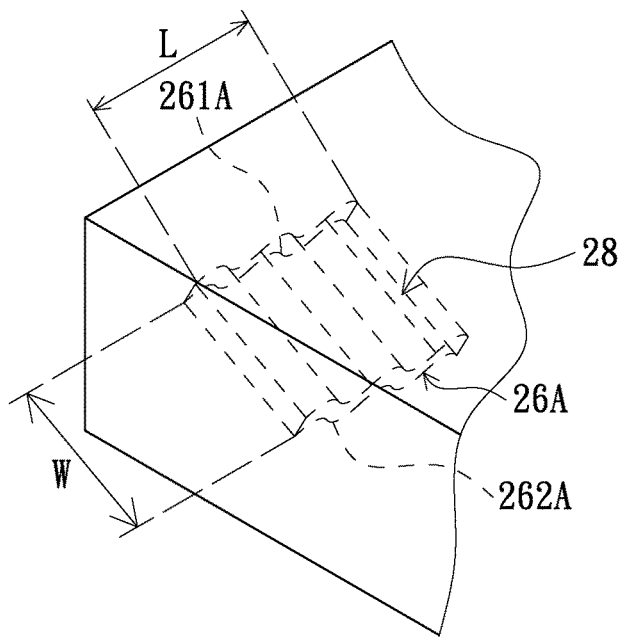
FIGS. 3A and 3B are schematic diagrams of different configurations of the inclined surface according to another embodiment of the present invention.
Figure 3B:
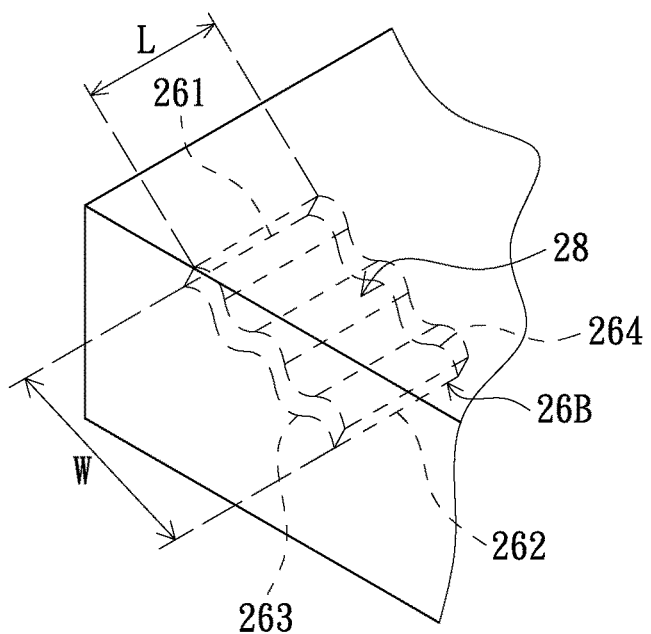

In one embodiment, the shape of the inclined surface 26 may be rectangular, circular, elliptical, polygonal, or a combination thereof. Moreover, the inclined surface 26 is not limited to a flat surface. FIGS. 3A and 3B are schematic diagrams of different configurations of the inclined surface according to another embodiment of the present invention. In one embodiment as shown in FIG. 3A, the first end edge 261A and the second end edge 262A of the inclined surface 26A have curvilinear ridgelines, and the inclined surface 26A and the transflective layer 28 thereon are undulating along the curvilinear ridgelines. In another embodiment as shown in FIG. 3B, the inclined surface 26B has a third end edge 263 and a fourth end edge 264 opposite to each other. The third end edge 263 and the fourth end edge 264 are connected between the first end edge 261 and the second end edge 262. The third end edge 263 and the fourth end edge 264 have curvilinear ridgelines, and the inclined surface 26B and the transflective layer 28 thereon are undulating along the curvilinear ridgelines. In one embodiment, the above-mentioned flat or undulating inclined surface 26/26A/26B has a maximum structure width W and a maximum structure length L. The maximum structure width W and the maximum structure length L are between 2 microns and 60 microns.

The transmittance of the transflective layer 28 is greater than the reflectance. Preferably, the transmittance of the transflective layer 28 is 70% and the reflectance of the transflective layer 28 is 30%, for example. In one embodiment, the transflective layer 28 is, for example, an optical coating or a rough surface layer.

Please refer back to FIG. 1. The light source assembly 18 is disposed beside the light incident surface 203. The illumination beam L1 emitted by the light source assembly 18 enters the light guide assembly 16 through the light incident surface 203. A part of the illumination beam L1 is reflected by the transflective layer 28 when the illumination beam L1 is transmitted to the transflective layer 28. The part of the illumination beam L1 is then transmitted to the second optical surface 202. The part of the illumination beam L1 then exits from the second optical surface 202 and is transmitted to the display panel 14. In one embodiment, the transflective layers 28 on the inclined surfaces 26 have different distribution densities in the light guide body 20. Specifically, the farther the area from the light source assembly 18, the higher the distribution density of the transflective layer 28. Thus, by the sparse and dense distribution of the transflective layer 28, the illumination beam L1 is evenly emitted from the second optical surface 202 and most of the emitted illumination beam L1 is distributed within a specific exit angle range. In one embodiment, a normal line N is defined to be perpendicular to the display panel 14, and the angle φ between the illumination beam L1 emitted to the display panel 14 and the normal line N is less than 45 degrees.

Please continue to refer to FIG. 1. The light source assembly 18 includes a light-emitting diode (LED) element 181. The illumination beam L1 generated by the light-emitting diode element 181 enters the light guide assembly 16 through the light incident surface 203, and a part of the illumination beam L1 is reflected by the transflective layer 28 to the second optical surface 202. In addition, the light source assembly 18 may further include a light angle converging element (not shown) disposed between the light exit side of the light-emitting diode element 181 and the light incident surface 203 of the light guide body 20. The light angle converging element can be a micro lens group, a light guide pipe, a micro cylindrical lens array, etc., to adjust the angular distribution of the illumination beam L1 of the light-emitting diode element 181 before the illumination beam L1 enters the light guide assembly 116.

Figure 4:
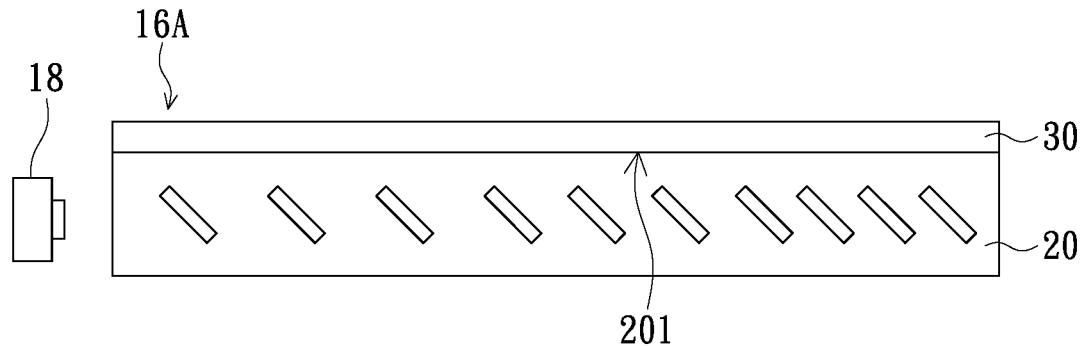
FIG. 4 is a schematic cross-sectional structure diagram of a front light source module according to another embodiment of the present invention.

FIG. 4 is a schematic cross-sectional structure diagram of a front light source module according to another embodiment of the present invention. As shown in FIG. 4, the front light source module 12A includes a light guide assembly 16A and a light source assembly 18. The light guide assembly 16A further includes a functional coating 30 disposed on the first optical surface 201 of the light guide body 20. The functional coating 30 can be an anti-glare layer or/and an anti-reflection structure layer, so as to achieve the effects of scratch resistance, anti-reflection and anti-glare.

Figure 5:
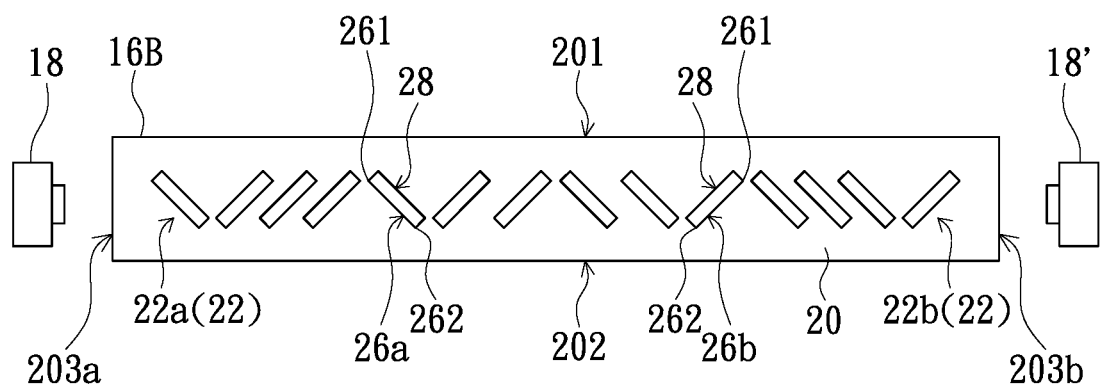
FIG. 5 is a schematic cross-sectional structure diagram of a front light source module according to another embodiment of the present invention.

FIG. 5 is a schematic cross-sectional structure diagram of a front light source module according to another embodiment of the present invention. As shown in FIG. 5, the front light source module 12B includes a light guide assembly 16B and two light source assemblies 18, 18'. The light guide assembly 16B includes a light guide body 20 and a plurality of surface optical microstructures 22. The light guide body 20 is, for example, in the shape of a plate and has a first optical surface 201, a second optical surface 202 and two light incident surfaces. The two light incident surfaces are the first light incident surface 203a and the second light incident surface 203b. The first optical surface 201 and the second optical surface 202 are opposite to each other. The first light incident surface 203a and the second light incident surface 203b are opposite to each other and connected between the first optical surface 201 and the second optical surface 202. In one embodiment, the first end edges 261 of the inclined surfaces 26a of a part of the surface optical microstructures 22 (the surface optical microstructures 22a) are biased toward the first light incident surface 203a, and the first end edges 261 of the inclined surfaces 26b of the other part of the surface optical microstructures 22 (the surface optical microstructures 22b) are biased toward the second light incident surface 203b. The inclined surfaces 26a and the inclined surfaces 26b are, for example, staggered to each other. The transflective layer 28 is disposed on each of the inclined surfaces 26a and 26b.

Please refer back to FIG. 1. In one embodiment of the reflective display device 10, an air barrier 32 is provided between the second optical surface 202 and the display panel 14. In an embodiment not shown, a transparent adhesive medium layer may be provided between the second optical surface 202 and the display panel 14, and the refractive index of the transparent adhesive medium layer is greater than 1.36. As shown in FIG. 1, the illuminating beam L1 incident from the light incident surface 203 exits the second optical surface 202 to the display panel 14. A part of the illuminating beam L1 is reflected by the display panel 14 as an image beam Li. The image beam Li passes through the light guide assembly 16 and exits the first optical surface 201 to the viewer 24. Specifically, a part of the image beam Li passes through the transflective layer 28 and reaches the first optical surface 201, and a part of the image beam Li passes through the areas between the adjacent transflective layers 28 and reaches the first optical surface 201. The first optical surface 201 is used as an image light emitting side, through which the image beam Li is emitted to the viewer 24.

In the embodiment of the present invention, the image presentation of the display panel 14 can be achieved by the reflection of the illuminating beam L1 of the front light source module 12. Thus, the low brightness and poor contrast of the image presented by the reflective display device 10 can be avoided when the external light source is insufficient, thereby improving the environmental adaptability of the reflective display device 10.

Figure 6:
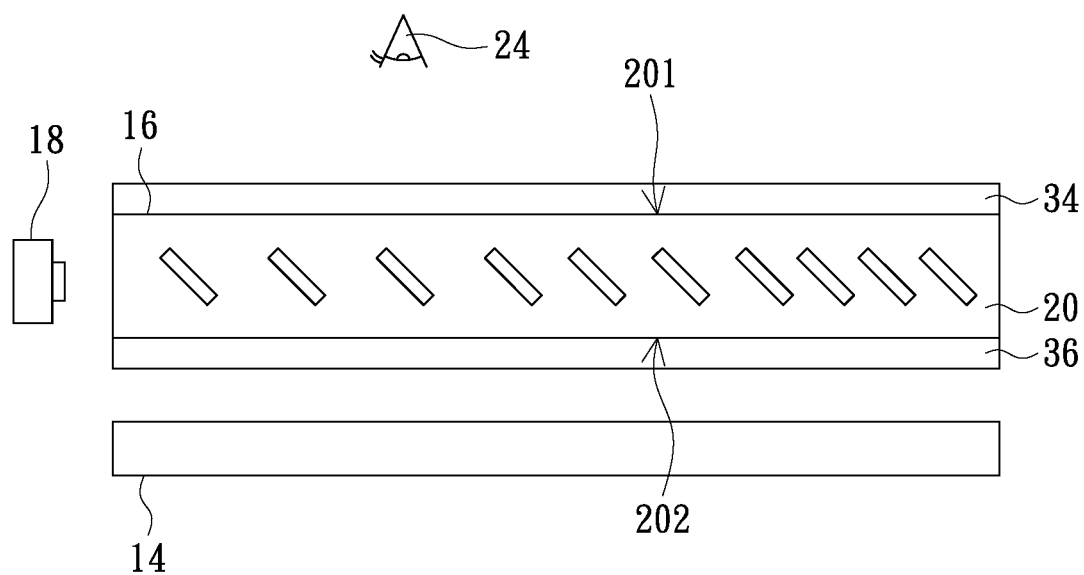
FIG. 6 is a schematic cross-sectional structure diagram of a reflective display device according to another embodiment of the present invention.

FIG. 6 is a schematic cross-sectional structure diagram of a reflective display device according to another embodiment of the present invention. As shown in FIG. 6, the main difference between the reflective display device 10A of FIG. 6 and the reflective display device 10 of FIG. 1 is that the reflective display device 10A further includes a transparent conductive layer 34 and a transparent conductive pattern layer 36. The transparent conductive layer 34 is disposed on one of the first optical surface 201 and the second optical surface 202, and the transparent conductive pattern layer 36 is disposed on the other one of the first optical surface 201 and the second optical surface 202. For example, in the embodiment shown in FIG. 6, the transparent conductive layer 34 is disposed on the first optical surface 201, and the transparent conductive pattern layer 36 with a coded pattern design is disposed on the second optical surface 202, so that the reflective display device 10A can have touch function.

Figure 7:
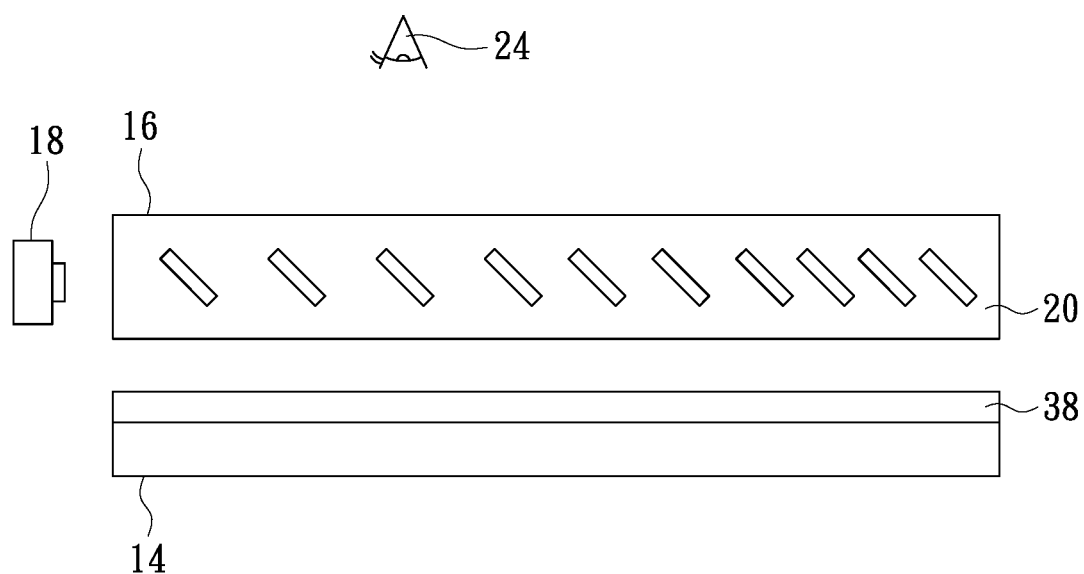
FIG. 7 is a schematic cross-sectional structure diagram of a reflective display device according to another embodiment of the present invention.

FIG. 7 is a schematic cross-sectional structure diagram of a reflective display device according to another embodiment of the present invention. As shown in FIG. 7, the main difference between the reflective display device 10B of FIG. 7 and the reflective display device 10 of FIG. 1 is that the reflective display device 10B further includes at least one phase difference optical layer 38 disposed between the display panel 14 and the light guide assembly 16 or/and between the light guide assembly 16 and the viewer 24. In the embodiment shown in FIG. 7, the phase difference optical layer 38 is, for example, disposed between the light guide assembly 16 and the display panel 14. In one embodiment, the phase difference optical layer 38 may provide, for example, a quarter to one-half of the phase difference of the incident polarized light source, so as to facilitate the use of the reflective display device 10B for a viewer 24 wearing sunglasses.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A front light source module applied to a reflective display device, and the front light source module comprising a light guide assembly and a light source assembly, wherein:
the light guide assembly comprises a light guide body and a plurality of surface optical microstructures, wherein:
the light guide body comprises a first optical surface, a second optical surface and at least one light incident surface, the first optical surface and the second optical surface are opposite to each other, the at least one light incident surface is connected between the first optical surface and the second optical surface, and the first optical surface is close to a viewer; and
the surface optical microstructures are embedded in the light guide body, each of the surface optical microstructures at least comprises an inclined surface and a transflective layer, the inclined surface is relatively inclined to one of the first optical surface and the second optical surface, and the transflective layer is disposed on the inclined surface,
wherein the transmittance of the transflective layer is greater than the reflectivity of the transflective layer,
wherein the inclined surface has a first end edge and a second end edge opposite to each other, the first end edge and the second end edge of the inclined surface have curvilinear ridgelines, and the inclined surface and the transflective layer thereon are undulating along the curvilinear ridgelines; and
the light source assembly is disposed beside the at least one light incident surface, wherein an illuminating beam incident from the at least one light incident surface is transmitted and reflected in the light guide assembly and exits the second optical surface to the display panel, a part of the illuminating beam is reflected by the display panel as an image beam, wherein a part of the image beam passes through the transflective layer, reaches the first optical surface and exits the first optical surface to the viewer, and a part of the image beam passes through the areas between the adjacent transflective layers, reaches the first optical surface and exits the first optical surface to the viewer.

2. The front light source module according to claim 1, wherein the first end edge is adjacent to the first optical surface, the second end edge is adjacent to the second optical surface, the first end edge is biased toward the light incident surface, and the second end edge is away from the light incident surface.

3. The front light source module according to claim 1, wherein a shape of the inclined surface is rectangular, circular, elliptical, polygonal, or a combination thereof, and a maximum structural width of the inclined surface is between 2 microns and 60 microns.

4. The front light source module according to claim 1, wherein the inclined surface is undulating, and a maximum structural width of the inclined surface is not greater than 60 microns.

5. The front light source module according to claim 1, wherein the surface optical microstructures are arranged in a matrix between the first optical surface and the second optical surface.

6. The front light source module according to claim 1, wherein the transflective layers of the surface optical microstructures have different distribution densities in the light guide body, wherein the farther an area from the light source assembly, the higher the distribution density of the transflective layers.

7. The front light source module according to claim 1, wherein the light guide body is made of a single polymer material or a layered combination of two or more polymer materials, and an optical haze of the light guide body is not greater than 25%.

8. The front light source module according to claim 1, wherein the transflective layer is an optical coating or a rough surface layer.

9. The front light source module according to claim 1, wherein the light source assembly comprises at least one light-emitting diode element.

10. The front light source module according to claim 1, wherein the light guide assembly further comprises a functional coating disposed on the first optical surface, and the functional coating is an anti-glare layer or an anti-reflection structure layer.

11. The front light source module according to claim 2, wherein an angle between the inclined surface and the second optical surface is between 3 degrees and 88 degrees, and angles of the inclined surfaces of the surface optical microstructures are consistent or inconsistent.

12. The front light source module according to claim 9, wherein the light source assembly further comprises a light angle converging element disposed between the light-emitting diode element and the light incident surface.

13. A reflective display device, comprising:
a display panel; and
a front light source module, disposed on the display panel and comprising a light guide assembly and a light source assembly, wherein:
the light guide assembly comprises a light guide body and a plurality of surface optical microstructures, wherein:
the light guide body comprises a first optical surface, a second optical surface and at least one light incident surface, the first optical surface and the second optical surface are opposite to each other, the at least one light incident surface is connected between the first optical surface and the second optical surface, and the first optical surface is close to a viewer; and the surface optical microstructures are embedded in the light guide body, each of the surface optical microstructures at least comprises an inclined surface and a transflective layer, the inclined surface is relatively inclined to one of the first optical surface and the second optical surface, and the transflective layer is disposed on the inclined surface, wherein the transmittance of the transflective layer is greater than the reflectivity of the transflective layer, wherein the inclined surface has a first end edge and a second end edge opposite to each other, the first end edge and the second end edge of the inclined surface have curvilinear ridgelines, and the inclined surface and the transflective layer thereon are undulating along the curvilinear ridgelines; and the light source assembly is disposed beside the at least one light incident surface, wherein the second optical surface of the front light source module faces the display panel, wherein an illuminating beam incident from the at least one light incident surface is transmitted and reflected in the light guide assembly and exits the second optical surface to the display panel, a part of the illuminating beam is reflected by the display panel as an image beam, wherein a part of the image beam passes through the transflective layer, reaches the first optical surface and exits the first optical surface to the viewer, and a part of the image beam passes through the areas between the adjacent transflective layers, reaches the first optical surface and exits the first optical surface to the viewer.

14. The reflective display device according to claim 13, wherein an air barrier is provided between the second optical surface and the display panel.

15. The reflective display device according to claim 13, wherein a transparent adhesive medium layer is provided between the second optical surface and the display panel, and a refractive index of the transparent adhesive medium layer is greater than 1.36.

16. The reflective display device according to claim 13, wherein the illumination beam emitted to the display panel is distributed within a specific exit angle range, a normal line is defined perpendicular to the display panel, and an angle between the illumination beam emitted to the display panel and the normal line is less than 45 degrees.

17. The reflective display device according to claim 13, further comprising a transparent conductive layer and a transparent conductive pattern layer, wherein the transparent conductive layer is disposed on one of the first optical surface and the second optical surface, and the transparent conductive pattern layer is disposed on the other one of the first optical surface and the second optical surface.

18. The reflective display device according to claim 13, further comprising at least one phase difference optical layer disposed between the display panel and the light guide assembly or between the light guide assembly and the viewer.

* * * * *